United States Patent [19]
Yamashita et al.

[11] Patent Number: 5,987,000
[45] Date of Patent: *Nov. 16, 1999

[54] DISC PACKAGE

[75] Inventors: Tatsumaro Yamashita; Kenji Abe, both of Miyagi-ken, Japan

[73] Assignee: Alps Electric Co., Ltd., Tokyo, Japan

[*] Notice: This patent is subject to a terminal disclaimer.

[21] Appl. No.: 08/931,345

[22] Filed: Sep. 16, 1997

[30] Foreign Application Priority Data

Sep. 25, 1996 [JP] Japan ................................ 8-252843

[51] Int. Cl.[6] .................................................. G11B 17/04
[52] U.S. Cl. .............................................................. 369/192
[58] Field of Search .................................. 369/34, 36, 38, 369/178, 191, 192, 291, 292; 360/91, 98.01, 98.04, 98.06; 206/307.1, 308.1, 308.3

[56] References Cited

U.S. PATENT DOCUMENTS

| | | | |
|---|---|---|---|
| 4,980,883 | 12/1990 | Mutou et al. | 369/291 |
| 5,481,514 | 1/1996 | Yamasaki et al. | 369/36 |
| 5,505,299 | 4/1996 | Ditzig et al. | 206/308.1 |
| 5,574,705 | 11/1996 | Suzuki | 369/36 |
| 5,638,347 | 6/1997 | Baca et al. | 369/34 |
| 5,671,198 | 9/1997 | Tsuchiya et al. | 369/34 |
| 5,886,961 | 3/1999 | Yamashita et al. | 369/34 |

FOREIGN PATENT DOCUMENTS

0717405 A2  6/1996  European Pat. Off. .
0717405 A3  10/1997  European Pat. Off. .

*Primary Examiner*—David L. Ometz
*Assistant Examiner*—Angel Castro
*Attorney, Agent, or Firm*—Brinks Hofer Gilson & Lione

[57] ABSTRACT

A disc package loaded in a disc device houses a plurality of trays, and discs of different types are installed on the respective trays. Each tray is provided with a hook and an identification hole indicative of type information of each disc, and an ejector lever for ejecting each tray is provided with a sensor for sensing the information of the identification hole. When the disc package is loaded, the identification of the disc on each tray is known by causing the ejector lever to face sequentially the hooks of the trays.

2 Claims, 11 Drawing Sheets

DISC PACKAGE

BACKGROUND OF THE INVENTION

1. Field of the Invention

The present invention relates to a disc device for use in a personal computer or an audio apparatus and, more particularly, to a disc package in which different types of discs such as CD, CD-ROM, DVD and PD are loaded in a mixed fashion.

2. Description of the Related Art

As optical disc media, a diversity of types of discs have been proposed. Optical disc media based on bit modulation system include CD (Compact Disk), CD-ROM (CD Read-Only Memory), and CD-R (CD Rewritable) that permits one-time writing only. Optical disc media performing read/write operation based on phase change include PD (Power Disk), and optical disc media capable of magneto-optical reading/writing include MO (Magneto-Optical Memory) and HS (Hyper Storage). Available as a large-storage disc for handling audio, video and computer data are DVD-ROM (Digital Versatile Disk) of bit modulation system and DVD-RAM (DVD Random Access Memory) capable of phase-change reading/writing. Also available as a small disc for handling audio and computer data is MD (Mini Disk) capable of magneto-optical reading/writing.

As for disc devices for driving discs, there is available one type to which a single disc of any of the above types is loaded, and also available is another type of disc device, like a CD changer, which is loaded with a plurality of discs of the same type at a time and selects any of them when driving it.

There has been proposed a disc device type that is equipped with disc driving means capable of driving both a CD and a DVD with both the CD and DVD loaded.

Most of the disc devices compatible with different types of discs are loaded with a single CD or a single DVD and no consideration is given to the possibility of concurrently loading different types of discs therewithin. No consideration is given either to such a disc device that can be loaded with a combination of a read-only disc and a rewritable disc at a time, such as a combination of CD with DVD-ROM or DVD-RAM, or a combination of DVD-ROM and DVD-RAM. In view of diversification in the applications of optical disc media arising from requirement for a diversity of computer software and greater amount of data, there is a need for a disc device to which different types of discs are concurrently loaded.

The conventional disc device loaded with different types of discs such as CD and DVD determines the type of a disc with an optical head by reading TOC (table of content) data of the loaded disc, or by sensing the thickness difference between the cover surface of the disc and its recording surface or sensing the track density of the disc. For this reason, the device takes a long time from the loading of a disc to determining the type of the disc and finally to an actual reproducing operation of the disc.

As for a disc to which both a read-only disc such as a DVD-ROM disc and a rewritable disc such as a DVD-RAM are loaded, an error may take place in the determination of the disc type, and, for example, if the DVD-ROM is mistaken for DVD-RAM, recording laser power will be applied to the DVD-ROM, possibly leading a destruction of recorded data on the DVD-ROM.

SUMMARY OF THE INVENTION

Accordingly, it is an object of the present invention to provide a disc package which permits different types of discs to be loaded into the case, permits one to preset the loading position of each disc according to the type of disc and permits one to easily determine which type of disc is actually loaded at what position in the case.

The disc package of the present invention accommodates a plurality of discs of two or more types in a case loaded in the body of a disc device.

In the disc package, discs of at least two types, for example, CD and DVD-RAM discs, and CD-ROM and DVD-RAM discs, are stored to their predetermined positions during use, and preferably, the disc package is put on the market with discs loaded to predetermined positions. The disc package may include, for example, a combination of a computer operating system and a plurality of application softwares, a combination of music data and video data, a combination of video game softwares, and a combination of encyclopedia. More preferably, a read-only disc (ROM-based discs) and rewritable disc (RAM-based disc) are loaded in a mixed fashion. A package having mixed ROM and RAM discs may serve as a personal-library-type memory from which both commercially available softwares and personally edited data and software are readily available.

The present invention is characterized in identification means in the disc package that helps recognize the type of disc loaded therein. When the disc package is loaded in the body of the disc device, the disc device accesses the identification means to recognize the types of the discs and sense where a RAM-based disc is loaded and where a ROM-based disc is loaded in the package.

According to a first aspect of the present invention, a disc package comprises a case that is to be loaded in the body of a disc device and a plurality of trays which receive respectively a plurality of discs of two or more different types and which are accommodated in the case in a manner such that the trays are individually pulled out of the case, wherein the trays are painted in different colors by the type of each disc received thereon.

In the disc package where both a tray and a disc placed on the tray can be together unloaded, by painting the trays in different colors, the type of the disc on such a tray is identified by the color of the tray. The trays for the RAM-based discs and the trays for the ROM-based discs are painted in different colors. For example, a window is formed in the case, through which the color of tray is seen from outside the case, and a user will thus recognize where the RAM-based disc is loaded immediately when the user glances at the package. For example, if the specifications of the disc package and disc device are established so that the RAM-based discs of the plurality of discs in the disc package are set to particular stacks, whether or not the tray having a RAM-based disc is set to a specified position is recognized visibly by its stack rather than by the color of the tray, and a wrong disc package is prevented from being used.

According to a second aspect of the present invention, a disc package comprises a case that is to be loaded in the body of a disc device and a plurality of trays which receive respectively a plurality of discs of two or more different types and which are accommodated in the case in a manner such that the trays are individually pulled out of the case, wherein the trays comprise respective identification means which are accessed by the disc device for recognizing the type of each disc received thereon.

The identification means provided is an identification projection provided in each tray, for example, and the presence or absence of the identification projection is detected by a mechanical switch. As for the tray having color coding, the color coding is used as identification means for each tray, a color sensor in the disc device senses the color of each tray, and the type of each disc is thus recognized. Each tray may be provided with an optical sensor or a magnetic sensor of a 1 bit to 3 bits or even greater bits, or the trays may be provided with resistor bodies of different resistance values.

Alternatively, each tray is preferably provided with a hook with which ejection means of the disc device is engaged, and the hook is provided with the identification means, which is accessed by the disc device through the ejection means. Since in this case, the engagement of the ejection means of the disc device with the hook on the tray permits the disc device to access the identification means on the tray, no other mechanism than the ejection means is required, and the structure of the disc device is thus simplified.

As for a disc package accommodating, in a case, color-coded trays or trays provided with respective identification means, the disc package with discs of at least two types mounted in the trays may be used or may be put on the market. It is optional to sell a disc package having trays and the case on the market, and in this case, installing a disc on each tray is left to each user's responsibility. The disc package of the present invention includes such a combination of the case and tray only.

The disc device of the present invention is loaded with a disc package of the type which accommodates a plurality of discs of at least two types in the case, and comprises ejection means for selecting one of the discs in the disc package and ejecting the disc from the case, disc driving means for driving the disc ejected, and sense means for sensing the type of each disc in the case by accessing the identification means provided in the disc package.

Preferably, the ejection means and sense means for sensing the identification means provided in each tray are mounted on a movable selection base that moves in the direction of stack of trays in the case. When the disc package is loaded, the movable selection base moves in the direction of tray stack to cause the sense means to access the identification means provided in each tray.

The disc device preferably comprises not only the sense means for sensing the type of each disc by accessing the identification means provided in the disc in the disc package, but also additional sense means for sensing the type of the disc. Adopted as the additional sense means for determining the type of the disc is the optical head of the disc driving means which detects the track pitch of the disc, senses the distance between the surface of a protective layer of the disc and its recording surface, or reads the TOC data to determine a difference among the TOC data. When the disc package is loaded, the identification means in each tray is accessed while the sensing by the optical head is performed to supplement the determination of the type of the disc, and the reliability of the determination of the type of the disc ejected is enhanced.

DESCRIPTION OF THE PREFERRED EMBODIMENTS

Figure 1:
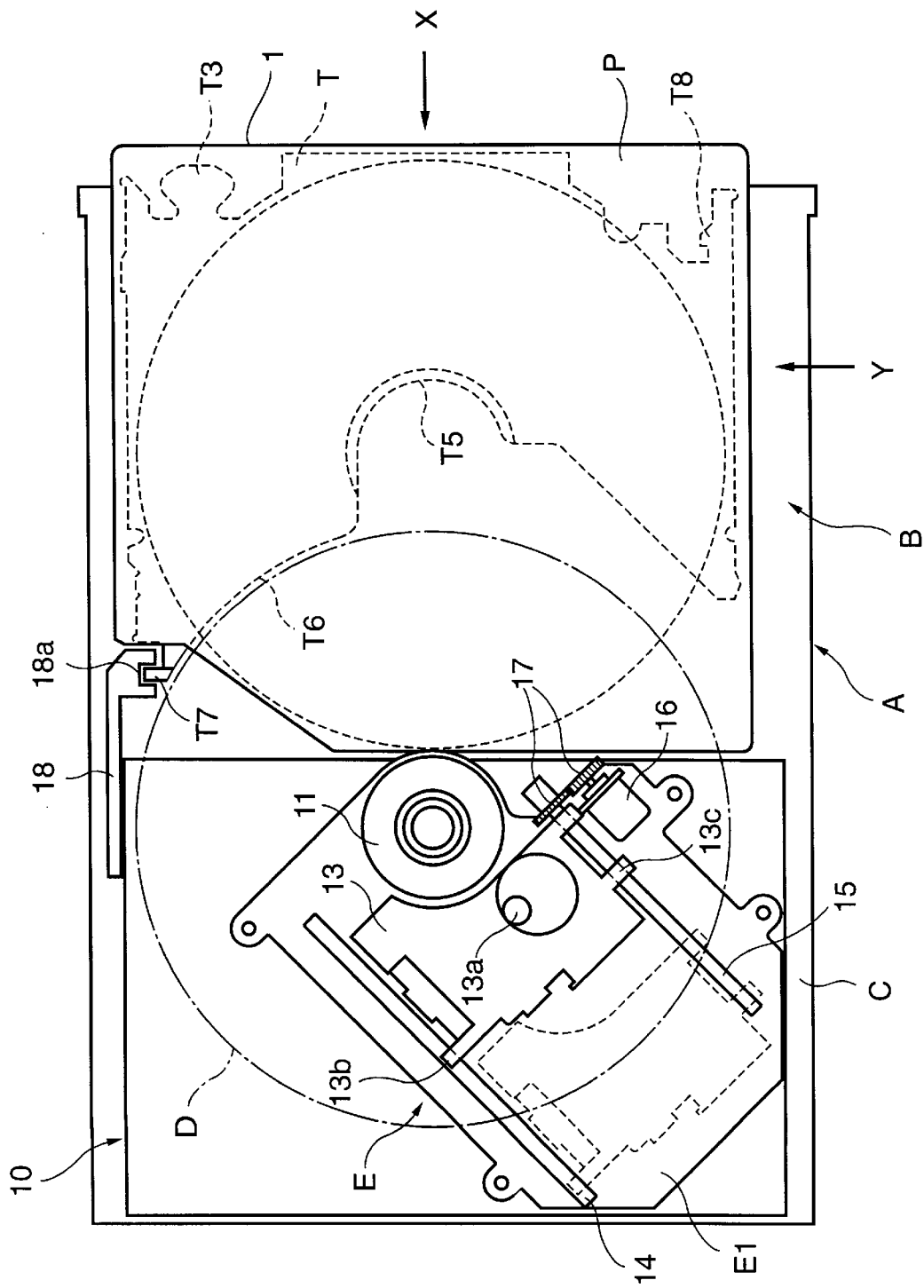
FIG. 1 is a horizontal sectional view of the disc device of the present invention.
Figure 2:
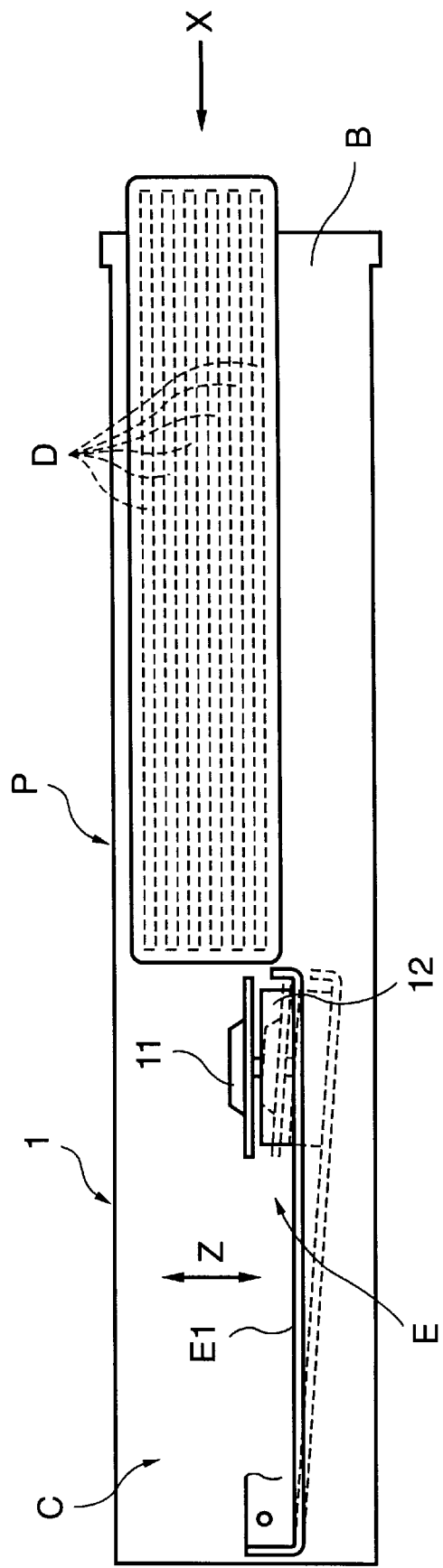
FIG. 2 is a vertical sectional view of the disc device of FIG. 1.
Figure 3:
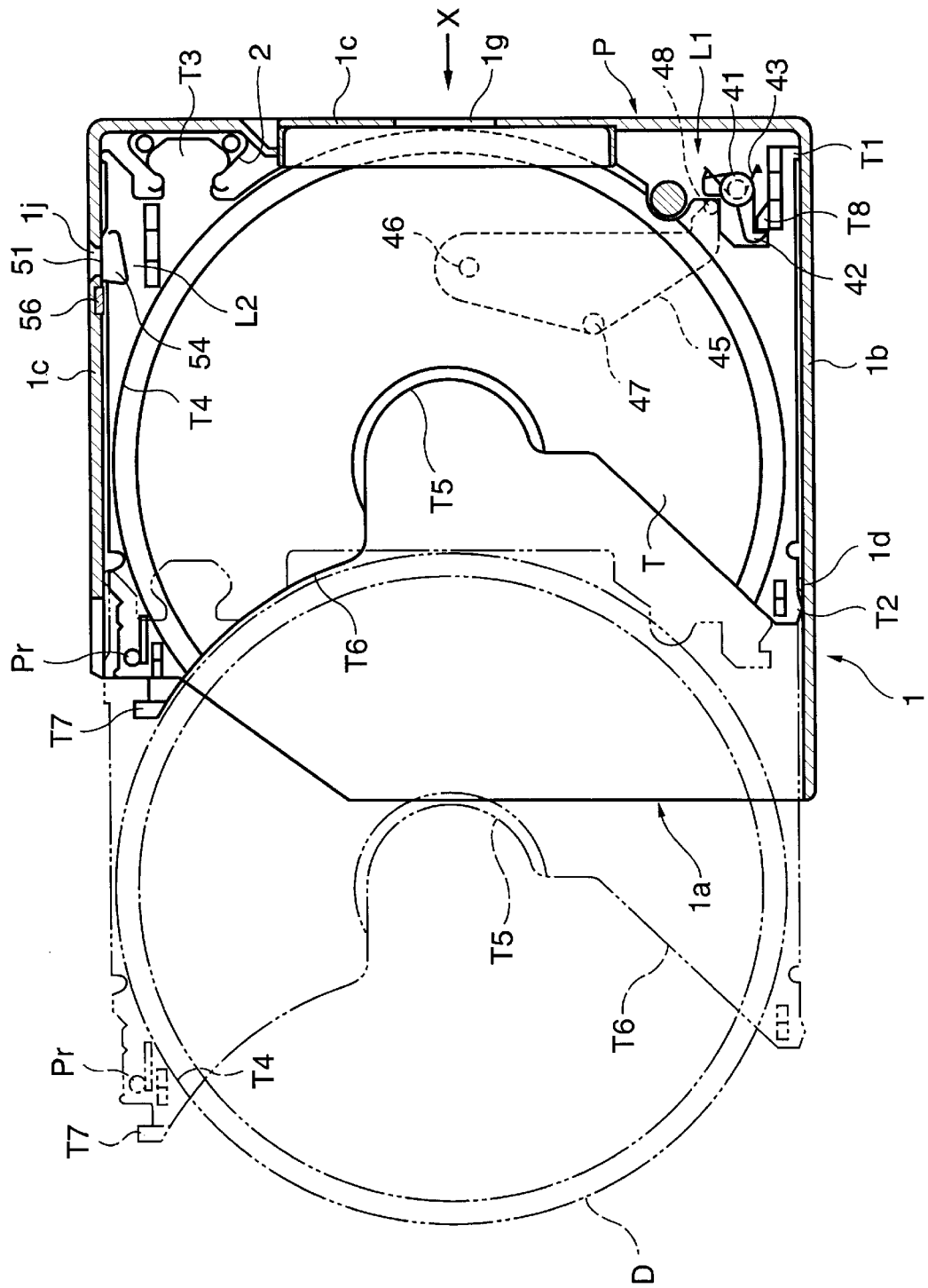
FIG. 3 is a horizontal sectional view of the disc package of the present invention incorporated in the disc device.
Figure 4:
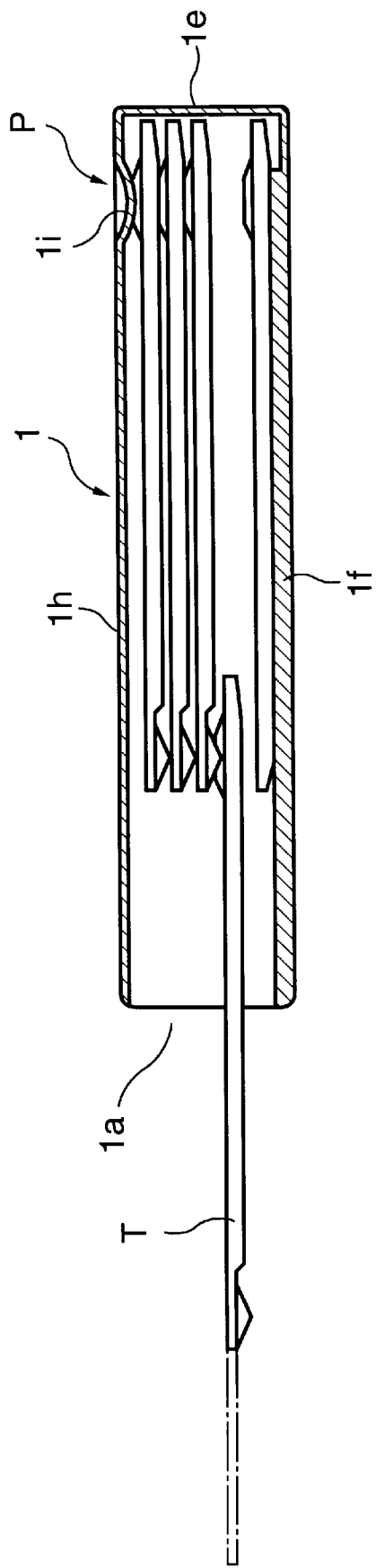
FIG. 4 is a vertical sectional view of the disc package of FIG. 3.
Figure 5:
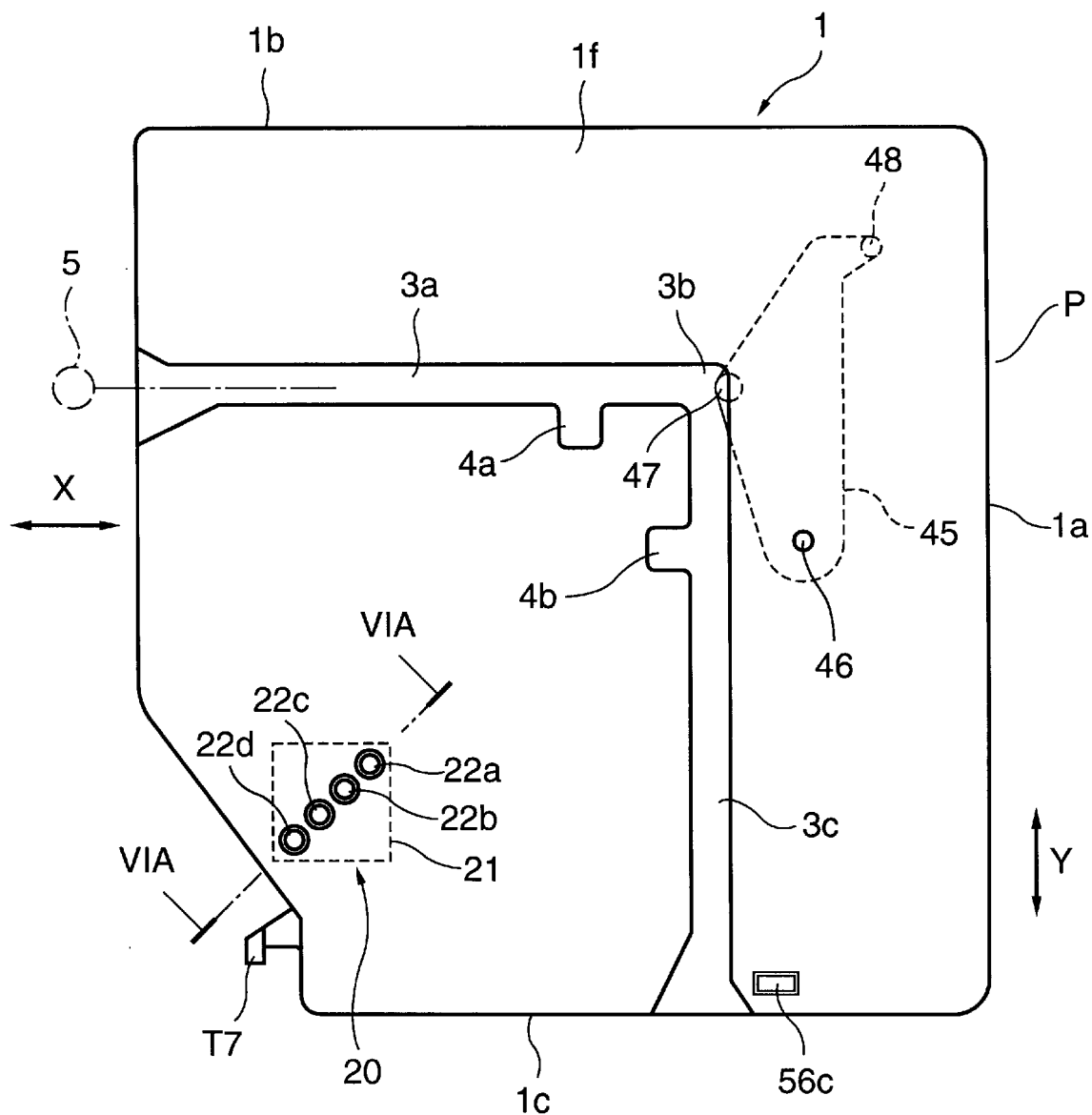
FIG. 5 is a bottom view of the disc package.

FIG. 1 is a horizontal sectional view showing one example of a disc device in which a disc package is loaded, FIG. 2 is a vertical sectional view of the disc device of FIG. 1, FIG. 3 is a horizontal sectional view of the disc package, FIG. 4 is a vertical sectional view of the disc package of FIG. 3, and FIG. 5 is a bottom view of the disc package. FIG. 6 and remaining drawings show details of the disc package and the disc device.

Outline of Disc Package

In the disc package shown in FIGS. 1 and 2, the body A of the device is rectangular in its plan view, and the device body A contains a package holding portion B for the disc package P and a disc drive portion C, and disposed in the disc drive portion C is disc driving means E for driving a disc D ejected from the disc package P.

The disc package P is loaded from the front of the device body A in the longitudinal direction of the device body A, namely in the X direction as shown in FIGS. 1 and 2.

The disc package P accommodates a plurality of discs, each being either a 12-cm diameter disc or an 8-diameter disc. Furthermore, ROM-based discs for read-only or reproduction-only operation and RAM-based discs rewritable are accommodated in a mixed fashion. The ROM-based discs include CD and DVD-ROM discs and the RAM-based discs include PD and DVD-RAM discs. The 8-cm diameter disc is a single CD.

The disc package P has a case 1 manufactured of synthetic resin. The case 1 has an opening 1a on the left-hand side in FIGS. 3 and 4, and the opening 1a serves as an ejection port for the tray T and the discs D.

The case 1 supports a plurality of trays T in a drawer fashion inside. In the example shown, the case 1 can accommodate up to five trays T. A plurality of horizontally inwardly projected ribs (not shown) are formed on a left-hand plate 1b and a right-hand plate 1c of the case 1, and the right edge and left edge of each tray T are guided between the horizontal ribs and slidably supported in the direction of X. As shown in FIG. 3, arranged on one side of the tray T (lower side of the tray T in FIG. 3) are a restriction projection T1 on the lower right corner and a restriction projection T2 on the lower left corner, and the left-hand plate 1b of the case 1 has on its inner surface a stopper projection 1d integrally formed therewith positioned between the restriction projections T1 and T2. A grip projection T3 is integrally formed with each tray at its top-right corner, and the front plate 1e of the case 1 on the right side in FIG. 3 is provided with a leaf spring 2 that retains the grip projection T3 in each tray T.

As shown by a solid line in FIG. 3, when the tray T is received in the case 1, the leaf spring 2 holds the grip projection T3 to keep the tray T in place, thus preventing the tray T from being ejected or loosened. When the tray T is pulled leftward through the opening 1a, the grip projection T3 comes off out of the leaf spring 2, and the tray T is now ready to be pulled out through the opening 1a. At the moment the tray T is drawn by a predetermined distance, the restriction projection Ti formed in the edge of the tray T abuts the stopper projection 1d of the case 1, where the tray T is at the most outwardly drawn position.

As shown in FIG. 3, the tray T at its outermost position from the case 1 is represented by chain lines, and referring to FIG. 4, a fourth tray T from the top is drawn. When the tray T is further forcibly pulled out, the portion of the restriction projection T1 is elastically deformed, the restriction projection T1 goes over the stopper projection 1d, and the tray T is now ready to be completely taken out.

On the top of each tray T shown in FIG. 3, a recess T4 is formed to accommodate a 12-cm diameter disc, and formed at the center of the recess T4 is a circular cutout T5 which exposes the center hole of the disc D downwardly. The tray T has also on its left-hand side a sector cutout T6 that is continuously formed from the circular cutout T5. When the tray T is pulled out to the position represented by the chain lines, the periphery portion of the disc D mounted in the recess T4 in the tray T pulled out comes within the sector cutout T6 of another tray T above, and thus comes clear of another tray T above. In the pulled state of the tray T represented by the chain lines in FIG. 3, the disc D is slightly lifted and rotated without touching the tray T immediately above the disc D. More particularly, the tray T is pulled out to the position where the center hole of the disc D is clear of the case 1, and the disc D on the tray T is ready to be driven even with part of the disc D still remaining inside the case 1.

When a small disc of 8-cm diameter is used, a tray T dedicated to a small-diameter disc may be loaded in any of the stacks in the case 1. The tray has on its top surface a recess T4 sized to accommodate the 8-cm diameter disc, and the rest of the structure of the tray remains unchanged from the tray for the 12-cm disc.

Shown on the left-hand side of the tray T is a hook T7 for imparting an eject assist force to the tray T out of the disc device side.

As shown in FIG. 5, a bottom plate 1f of the case 1 in the disc package P has a guide groove 3a extending in the X direction, while the bottom of the package holding portion B of the disc device shown in FIGS. 1 and 2 has a guide projection 5 on which the guide groove 3a slides with almost no looseness therebetween. When the disc package P is inserted in the X direction into the package hold portion B, the guide groove 3a formed in the bottom plate 1f meets and then slides on the guide projection 5. When an end portion 3b of the guide groove 3a extending in the X direction abuts the guide projection 5, the loading operation of the disc package P is complete. An unshown locking member provided in the package hold portion B in the device body A is engaged with a lock notch 4a formed in the guide groove 3a, locking the disc package P.

While the disc package P is loaded in the X direction in the disc device shown in FIG. 1, the disc package P may be loaded in a direction of Y in another form of the disc device, and in this case, again, the same disc package P may be used. More particularly, as shown in FIG. 5, the bottom plate 1f of the case 1 has a guide groove 3c extending in the Y direction, and a lock notch 4b is formed in the middle of the guide 3c. When the disc package P is loaded in the Y direction, the guide groove 3c extending in the Y direction slides on the guide projection 5 in the package hold portion B.

Structure of Disc Device

A movable selection base 10 is arranged in the disc drive portion C in the body A of the disc device shown in FIGS. 1 and 2. Also provided in the device body A is a raise/lower mechanism, a driving force of which is used to raise and lower the movable selection base 10 in the direction of stack of trays T (Z direction). By controlling the vertical position of the movable selection base 10 in the Z direction, any tray T is selected from the disc package P loaded.

The disc driving means E is mounted on the movable selection base 10. The disc driving means E comprises a turn table 11 for retaining the center hole of the disc D above a driving base E1 and a spindle motor 12 for driving the turn table 11. Also provided are a guide shaft 14 extending generally radially across the disc D and a driving screw shaft 15 extending in parallel with the guide shaft 14, the guide shaft 14 slidably supports a bearing 13b of an optical head 13, and a female threaded portion 13c of the optical head 13 is put into screw engagement with the driving screw shaft 15. The optical head 13 contains a light emitting element such as a laser diode, a light receiving element for sensing a light reflected from the disc, and an optical element like a beam splitter, and an objective lens 13a is directed to the recording surface of the disc D.

The optical head 13 can read discs D of different types such as CD and DVD. As the objective lens 13a, one is switchable selected from two lenses having different focal lengths.

The disc driving means E has a sled motor 16 on the driving base E1, and its force is transmitted to the driving screw shaft 15 via a gear group 17. The rotation of the driving screw shaft 15 moves the optical head 13 radially across the disc D.

Although the disc device shown in FIG. 1 is a reproduction-only device, disc driving means E having a recording capability may be arranged if the disc device is of a rewritable type. For example, when the rewritable disc D is based on a magneto-optical recording system, a magnetic head faces the objective lens 13a from above with the disc D interposed therebetween.

The movable selection base 10 having the disc driving means E is raised and lowered in the Z direction, and a tray T is selected from the disc package P according to the vertical position of the base 10. In the state in which the movable selection base 10 stops in front of a selected tray T, the driving base E1 on the movable selection base 10 is pivoted between a horizontal position represented by a solid line and a downward tilted position represented by a broken line as shown in FIG. 2. As shown in FIG. 2, for example, the movable selection base 10 stops at a position where the tray T at the second stack from the bottom may be selected, and the driving base E1 is tilted as shown by the broken line before the tray T is pulled out, and reverts back to its horizontal position after the tray T is pulled out, and the turn table 11 is engaged with the center hole of the disc D. The disc D is then slightly lifted and clamped between the turn table 11 and an unshown clamp member, and is then rotated.

As shown in FIG. 1, an ejector lever 18 as the ejection means is provided on the side of the movable selection base 10. The ejector lever 18 is raised and lowered integrally with the movable selection base 10 in the Z direction, and is driven leftward by an ejection drive mechanism mounted on the movable selection base 10. When the movable selection base 10 is at its lowermost position in the device body A, the ejector lever 18 is out of the hook T7 of the tray, but when the movable selection base 10 is raised to any position where one tray T can be selected, a notch 18a of the ejector lever 18 is ready to engage with the hook T7 of the selected tray T. As shown in FIG. 2, for example, the movable selection base 10 stays at the position where the second tray T from the bottom is selectable, and the notch 18a of the ejector lever 18 shifts to a position where it can engage with the hook T7 of the second tray T from the bottom. Driven leftward in this state, the ejector lever 18 draws the selected tray T within the disc driving means E.

Identification Means for Determining Type of Disc

The disc package P accommodates discs of at least two different types, and the identification means for helping determine the types of discs is provided on the side of the disc package P.

The tray T is manufactured of a synthetic resin material, and each tray is entirely painted by a color so that the type of disc installed on the tray is identified by the color of the tray. For example, the color of the tray T for CD may be "gray", the color of the tray T for DVD-ROM may be "blue", the color of the tray T for PD may be "red", and the color of the tray T for DVD-RAM may be "green". By such color coding, the user may visually discriminate between the RAM-based discs and the ROM-based discs, and may further visually recognize the recording system of each disc. Alternatively, two colors only may be used to differentiate the trays for the RAM-based discs from the trays for the ROM-based discs.

In the disc package P shown in FIG. 3, one can visually recognize the color of each tray T through the opening 1a of the case 1. A window 1g is opened in the right-hand surface of the case 1, namely in the front plate 1e which is seen from the front of the disc device when the disc package P is loaded, and a transparent panel is attached to the window 1g. In the disc package P in its loaded state in the disc device, the color of the tray T inside the case 1 is visually recognized through the window 1g formed in the front plate 1e from the front of the device.

Referring to FIG. 5, the bottom plate 1f of the case 1 in the disc package P is provided with identification means 20 indicative of the type of disc loaded therein.

Figure 6A:
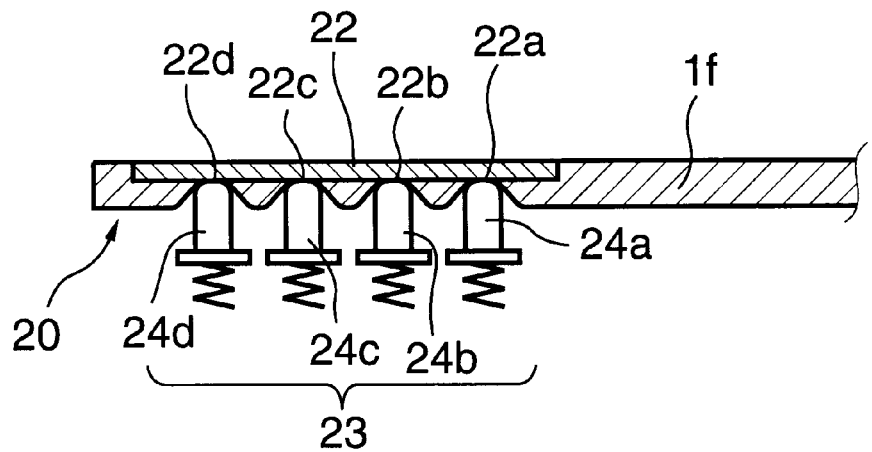
FIG. 6A is a cross-sectional view, taken along a line VIA—VIA in FIG. 5, and showing identification means provided in the case of the disc package and sense means accessing to the identification means.
Figure 6B:
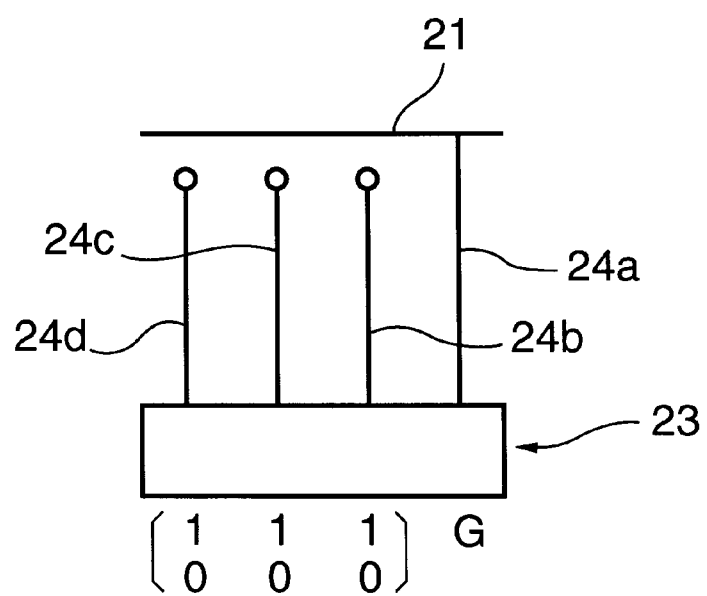
FIG. 6B is a schematic diagram of these means.

FIG. 6A is an enlarged cross-sectional view taken along a line VIA—VIA in FIG. 5 showing the identification means 20, and FIG. 6B is its schematic diagram.

The identification means 20 comprises a jumper card 21 embedded in the thickness of the bottom plate 1f of the case 1, and four identification holes 22a, 22b, 22c, and 22d which are opened or closed to be connected to the jumper card 21. The package hold portion B in the body A of the device contains sense means 23 that accesses the identification means 20, and the sense means 23 comprises four sense pins 24a, 24b, 24c and 24d corresponding to the identification holes 22a, 22b, 22c and 22d. When the disc package P is loaded in the package hold portion B, the sense pins 24a, 24b, 24c and 24d are urged to the identification holes 22a, 22b, 22c and 22d by springs.

The pin 24a, one of the four sense pins, is a ground pin (at ground potential), and whether the sense pin 24a is connected to each of the sense pins 24b, 24c and 24d determines the type of the disc. While the ground pin 24a is always connected via the identification hole 22a to the jumper card 21, the remaining identification holes 22b, 22c and 22d may be opened or closed according to identification information. For example, if the identification hole 22b is opened, the sense pin 24b is put into contact with the jumper card 21, thereby connecting itself to the sense pin 24a. This state is now designated "1", and when the identification hole 22b is closed, the sense pin 24a remains unconnected to the pin 24b, and this state is designated "0". The identification holes except for the one for the ground pin are three in total, and 3-bit identification information (8 pieces of information) is thus obtained by the sense means 23 which accesses the identification means 20 from the device body A side.

The use of the 3-bit information allows the disc device to know what RAM-based disc or ROM-based disc D is stored at what stack in the disc package P. The disc device can know up to the five discs in combination. By increasing the number of identification holes, the disc device can obtain more identification information.

The identification means 20 indicating several bit of information is not limited to the jumper card 21, and, for example, a plurality of reflective sheets may be attached to the outer surface of the case 1, the disc device is provided with a photoreflector which emits a light to the reflective sheet and senses a reflected light, and whether a reflective sheet is present or absent, namely, whether a light is reflected by the predetermined identification position determines the identification information of the disc within the disc package P.

Alternatively, a memory element such as an IC card may be embedded in the case 1, and the IC card may be accessed by a contact point at the device body A side. Since the use of the IC card increases the amount of information held by the case 1, the disc device may receive not only the type information of the disc stored in the case 1 but also the index of the information and other TOC or similar data stored in each disc.

Figure 7A:
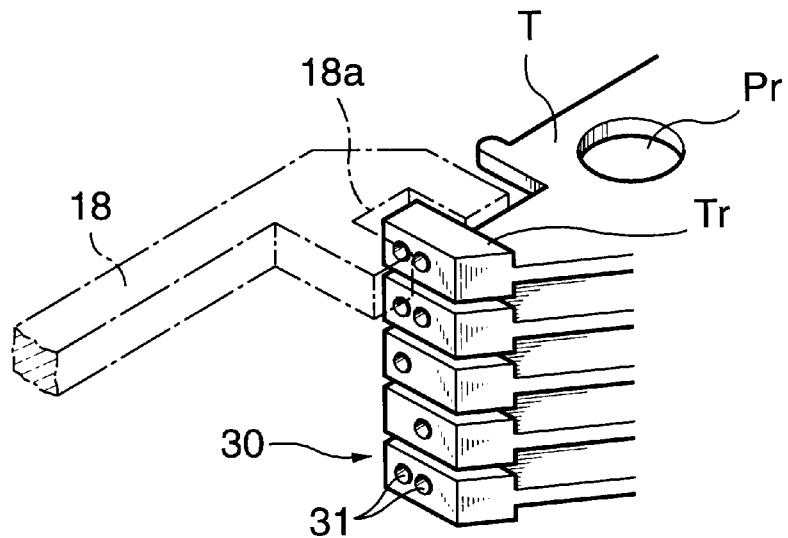
FIG. 7A is a fragmentary perspective view showing identification means in each tray in the disc package and sense means accessing to the identification means.
Figure 7B:
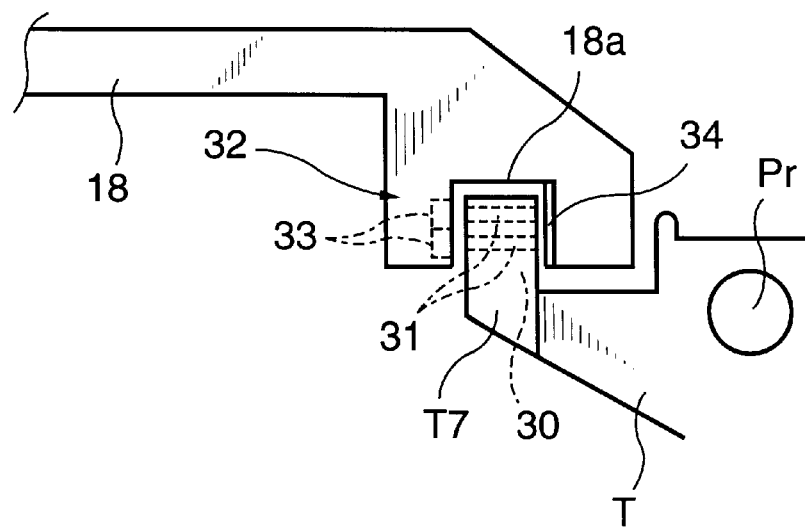
FIG. 7B is a fragmentary plan view of these means.

Referring to FIG. 7, individual identification means 30 is provided in each tray T accommodated in the case 1. FIG. 7A is a perspective view showing the identification means provided in each tray and sense means provided on the disc device, and FIG. 7B is their plan view.

The identification means 30 is provided in the hook T7 in each tray T. The identification means 30 comprises 2-bit identification holes 31 formed in the hook T7 in each tray. Sense means 32 is provided in the ejector lever 18 mounted on the movable selection base 10. The sense means 32 comprises two photoreflectors 33 on one inner surface of the recess 18a and a reflective sheet (a reflective surface) 34 mounted on the opposing inner surface of the recess 18a. The identification holes 31 are opened or closed to give identification information, and when one identification hole 31 is opened, a sensing light emitted from the photoreflector 33 passes through the identification hole 31 and reflected by the reflective sheet 34, and then sensed by the photoreflector 33. Information of "1" or "0" is obtained depending o n whether the identification hole is opened or closed, respectively. Since the two identification holes 31 are provided in each tray T, each tray T has 2-bit information. The use of the 2-bit information allows one to know the identification of the disc in the tray T, for example, identify what RAM-based disc or ROM-based disc D is stored at what stack in the disc package P and identify the recording system of the disc.

As shown in FIG. 7, the sense means 32 which accesses the identification means 30 from the disc device side is provided in the ejector lever 18, and the ejector lever 18 is designed to move integrally with the movable selection base 10 in the Z direction as shown in FIG. 2. Immediately after the disc package P is loaded in the device body A, the movable selection base 10 is moved in the Z direction so that the sense means 32 on the ejector lever 18 faces sequentially the identification means 30 of the trays T. Means for sensing t he vertical position of the movable selection base 10 is provided in the disc device and this sensing means determines which identification means 30 of the tray T faces the sense means 32. Based on this determination and the 2-bit information picked up by the sense means 32, the disc device knows the identification information of each disc in the disc package P immediately after the disc package P is loaded.

The identification means 30 provided in each tray T is not limited to the above method of sensing the presence or absence of the identification holes 31, and for example, the mounting position of a reflective sheet is set at somewhere on the tray T, a photoreflector facing the reflective sheet is mounted on the movable selection base 10, and the identification information of the disc is obtained by sensing whether each tray T has the reflective sheet attached. Alternatively, an identification projection on the tray T and a switch provided on the movable selection base 10 may be used, wherein the identification of the disc may be derived by causing the switch to sense whether the identification projection is present or absent on the tray T.

It will be perfectly acceptable to employ either or both of the identification means 20 provided in the case 1 shown in FIG. 5 and the identification means 30 provided in each tray T.

It will be possible to use both the identification information derived from the identification means 20 provided in the case 1 and/or the identification means 30 provided in the tray and the identification information that is derived by reading the TOC data of the disc D or sensing the track pitch by means of the optical head 13. By using the identification information from the case and/or the tray and the identification information that is obtained by directly accessing to the disc with the optical head 13, the accuracy of the identification of the disc type is enhanced. For example, the recording surface of a ROM-based disc, if mistaken for a RAM-based disc, may be subject to a recording laser power and the information stored in the ROM-based disc is possibly destroyed. With the above arrangement, such a trouble is precluded.

As shown in FIG. 3, a write protect section Pr is arranged inside the hook T7 of the tray T. The write protect section Pr is provided on the tray for the RAM-based disc only, and is constituted by a thin portion of the tray. In case of a rewritable disc, when the tray T is pulled out by the disc driving means E to a position where the disc is driven, a sensor section faces the write protect section Pr of the disc. The sensor section comprises a light emitting element facing one side of the write protect section Pr and a light receiving section facing the other side of the write protect section Pr. When the write protect section Pr remains a thin portion, the light from the light emitting element is blocked, the light receiving element receives no light, and the RAM-based disc is determined to be rewritable. When a through-hole is made by destroying the thin portion of the write protect section Pr, the sensing light passes through and even a RAM-based disc is determined to be not rewritable.

In this way the determination of whether a disc on a tray T is rewritable is made using the tray having the disc thereon.

Lock Mechanism of Disc Package

The disc package P shown comprises a first lock mechanism L1 for precluding an inadvertent ejection of all the trays T when the disc package P is unloaded from the disc device, and a second lock mechanism L2 for precluding an ejection of the trays having the RAM-based discs only on condition that the first lock mechanism L1 is released. By precluding particularly the ejection of the tray having the RAM-based disc, an inadvertent ejection of the RAM-based disc and a possible smearing or damaging of the recording surface of the RAM-based disc are precluded when the disc package P is unloaded from the disc device.

Figure 8:
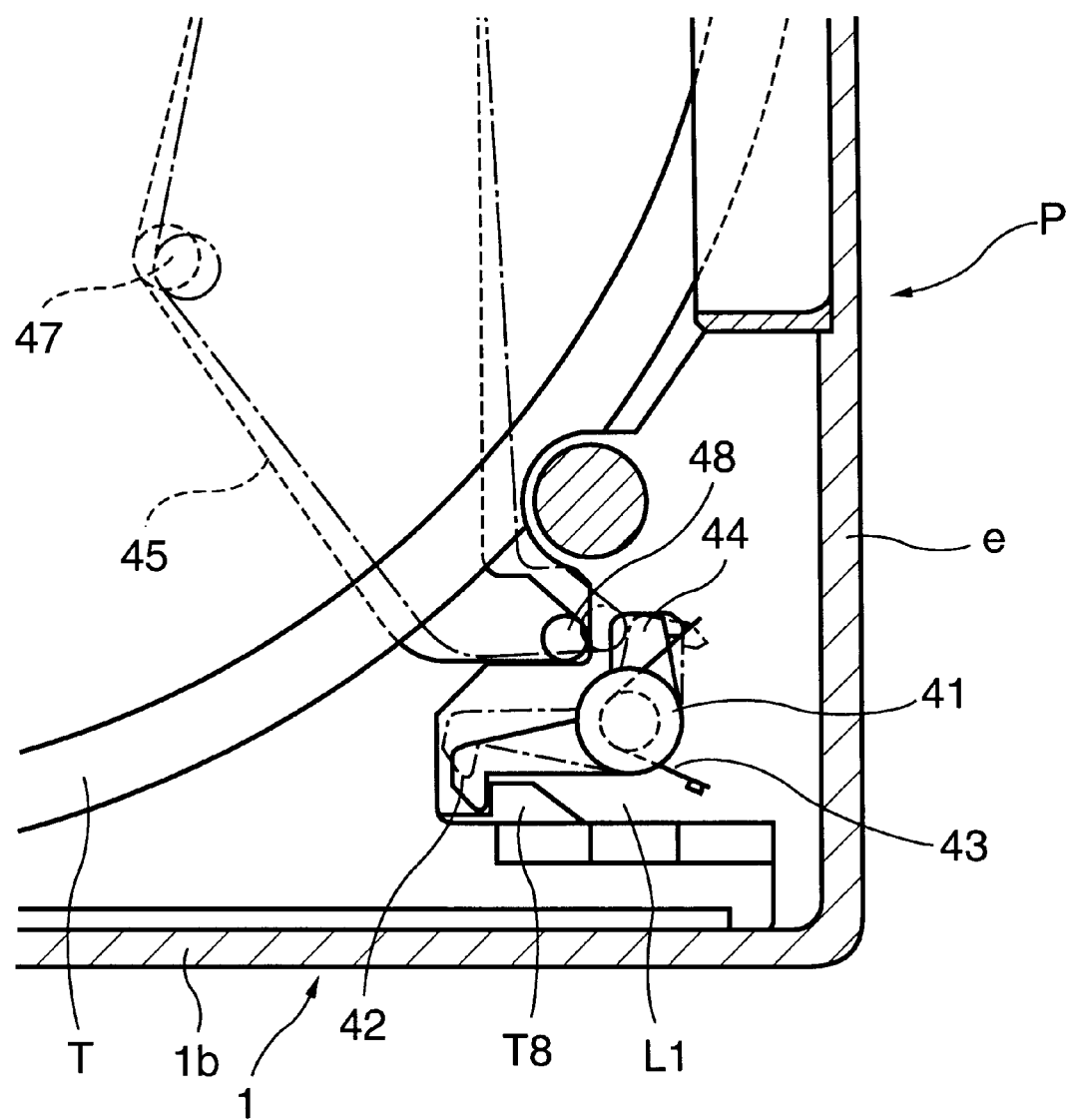
FIG. 8 is a fragmentary horizontal sectional view showing a first lock mechanism provided in the disc package.
Figure 9:
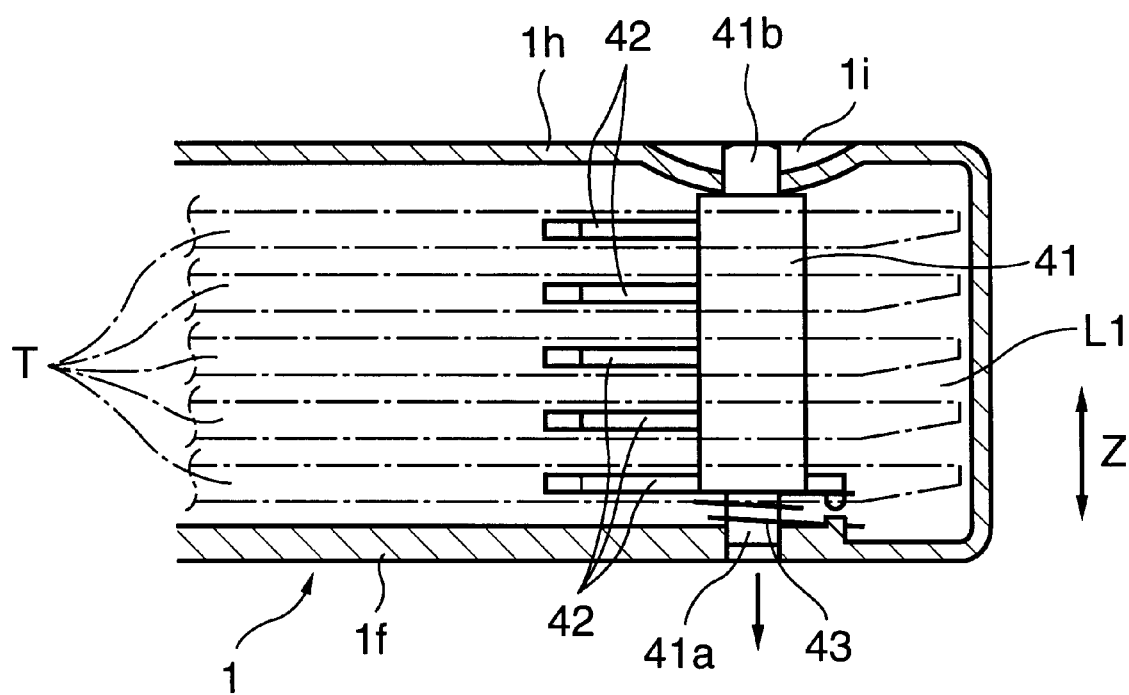
FIG. 9 is a vertical sectional view of the first lock mechanism of FIG. 8.

FIG. 8 is a fragmentary horizontal sectional view of the disc package P showing the first lock mechanism L1, and FIG. 9 is a vertical sectional view showing generally the same portion as FIG. 8.

A lock shaft 41 is arranged in the case 1 in the disc package P. A small-diameter shaft 41a, integrally formed with the lock shaft 41 on its bottom portion, is inserted through the bottom plate 1f of the case 1, and a small-diameter shaft 41b, integrally formed with the lock shaft 41 on its top portion, is inserted from below into a recess 1i formed in the top surface 1h of the case 1. As a result, the lock shaft 41 is rendered rotatable, and slidable downward in the Z direction from its position shown in FIG. 9. As shown in FIG. 9, a torsional coil spring 43 is fitted around the circumference of the small-diameter shaft 41a on the bottom, and the lock shaft 41 is urged counterclockwise by the elastic force of the torsional coil spring 43 as shown in the horizontal sectional view in FIG. 8 while the lock shaft 41 is urged upward by the torsional coil spring 43 as shown in FIG. 9. As a result, the small-diameter shaft 41b at the top portion of the lock shaft 41 is projected into the recess 1i of the top surface 1h of the case 1, and functions as a lock release section.

The lock shaft 41 is provided with five equally spaced locking pawls (locking sections) 42 integrally formed therewith. All the trays T accommodated in the case 1 have respective locking projections T8 integrally formed therewith corresponding to the locking pawls 42. A projection 44 inwardly extending in the case 1 is integrally formed with the lock shaft 41.

As shown in FIGS. 3 and 8, a lock release lever 45 is arranged on the inner surface of the bottom plate 1f inside the case 1. The lock release lever 45 is rotatably supported about a support pin 46 attached to the inner surface of the bottom plate 1f and is urged clockwise by an unshown spring member as shown in FIGS. 3 and 8. The lock release lever 45 has on its one end a pressure portion 48 which faces the projection 44 formed on the lock shaft 41.

The lock release lever 45 has, on its middle, a projection 47 integrally formed therewith, and, as shown in FIG. 5, the projection 47 is slightly projected into an end portion 3b where the guide groove 3a running in the X direction joins the guide groove 3c running in the Y direction in the bottom plate 1f of the case 1.

When no disc package P is loaded in the disc device, the lock shaft 41 remains shifted upward by the torsion coil spring 43 in the Z axis as shown in FIG. 9, and is rotated counterclockwise as shown in FIG. 8. In such a state, the locking pawls 42 extended from the lock shaft 41 are engaged with the locking projections T8 provided on all trays T in the case 1 so that all trays T are locked, preventing themselves from being ejected.

When the disc package P is inserted into the package hold portion B of the device body A in the X direction, the guide groove 3a shown in FIG. 5 slides on the guide projection 5 arranged in the device body A, the disc package P is fully inserted into the package hold portion B, the unshown lock member is engaged with the lock notch 4a, and when the case 1 is locked, the guide projection 5 reaches the end portion 3b of the guide groove 3a pushing the projection 47. When the disc package P is inserted into the disc device in the Y direction, the operation described above also applies, and the guide projection 5 reaching the end portion 3b of the guide groove 3c also pushes the projection 47.

With the projection 47 pushed by the guide projection 5, the lock release lever 45 is pivoted counterclockwise as shown in FIGS. 3 and 8 (clockwise in the bottom view in FIG. 5). The pressure portion 48 provided on the one end of the lock release lever 45 presses the projection 44, thereby rotating the lock shaft 41 clockwise and disengaging the locking pawls 42 from the respective locking projections T8 in the respective trays T.

When the disc package P is unloaded from the disc device, all trays T are locked by the locking pawls 42 to preclude an inadvertent ejection of the trays T. When the disc package P is loaded into the package hold portion B, the lock of all trays T with the first lock mechanism L1 is released.

When the small-diameter shaft 41b projected into the recess 1i in the top surface 1h of the case 1, namely, the lock release section, is pressed by a finger, with the disc package unloaded from the disc device, the lock shaft 41 slides downward in the Z axis against the elastic force of the torsion coil spring 43. The locking pawls 42 integrally formed with the lock shaft 41 are shifted between the trays T, thereby releasing all trays T out of the first lock mechanism L1.

Figure 10:
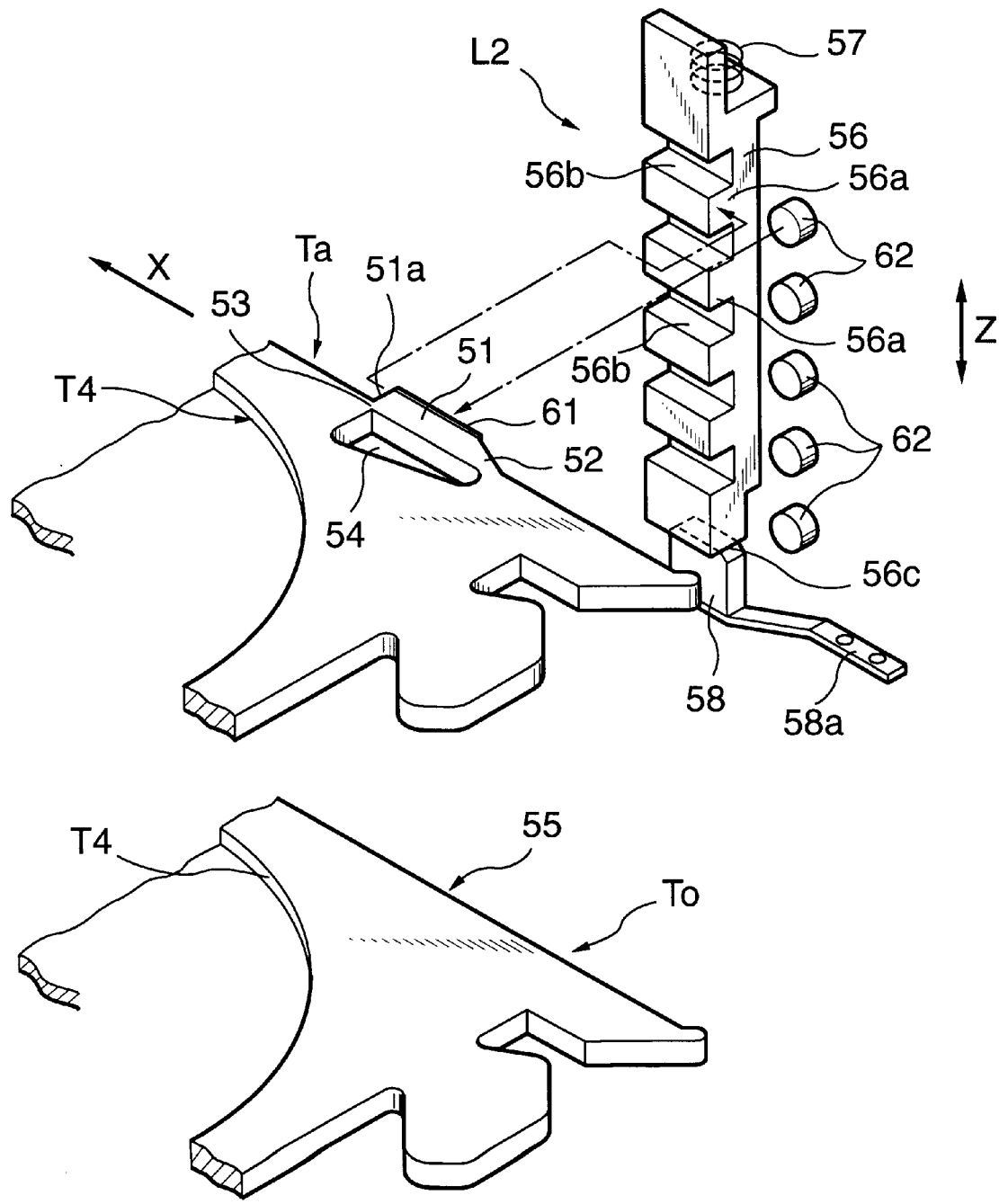
FIG. 10 is a fragmentary exploded perspective view of a second lock mechanism provided in the disc package.
Figure 11B:
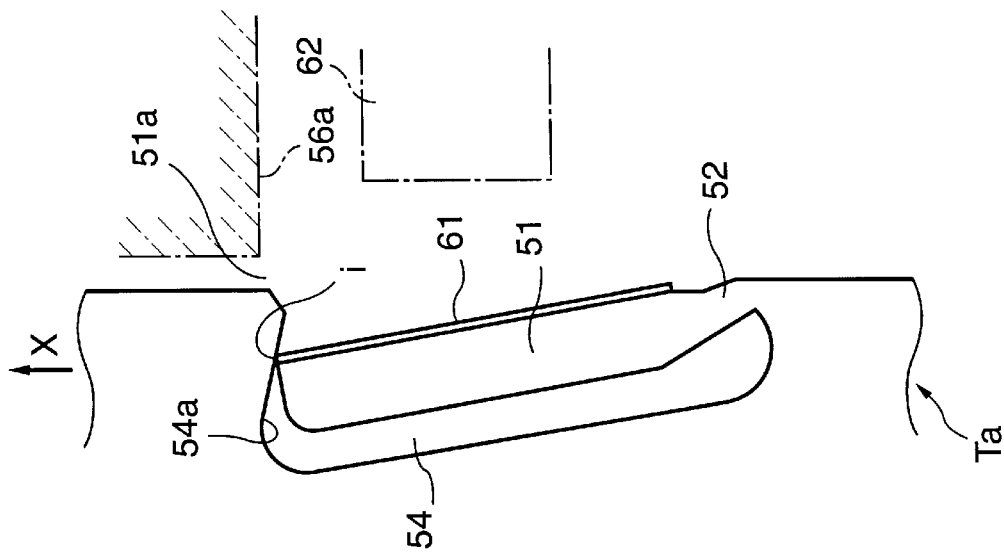
FIGS. 11A and 11B are a fragmentary enlarged plan views showing the relationship of the second lock mechanism and the tray having the RAM-based disc thereon in their different states.
Figure 11A:
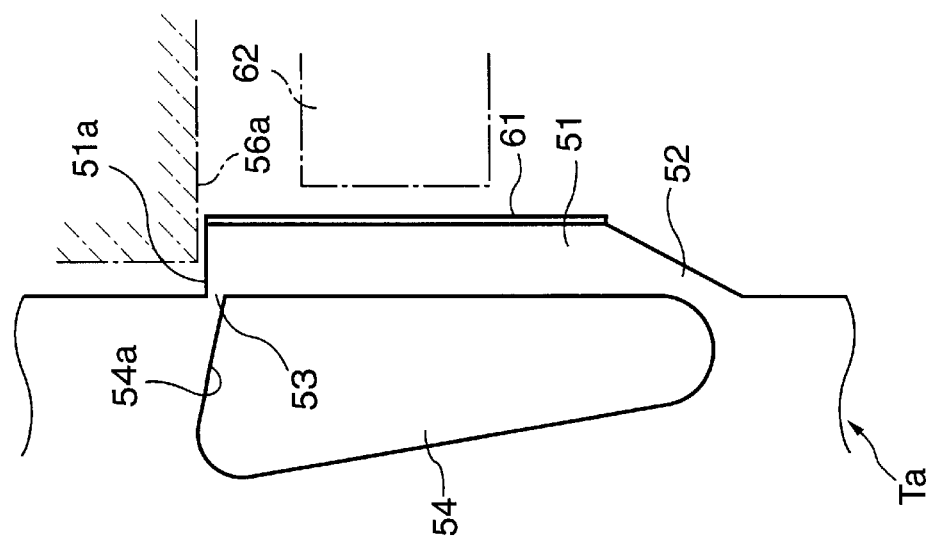

FIG. 10 is a fragmentary exploded perspective view showing the structure of the second lock mechanism L2, and FIGS. 11A and 11B are enlarged plan views showing the relationships of the second lock mechanism L2 with the tray for the RAM-based disc in their different states.

The second lock mechanism L2 serves the locking purpose for locking the trays T on which the RAM-based discs only are installed. As shown in FIG. 10, a reference character Ta designates a tray dedicated to a RAM-based disc and a reference character To designates a tray dedicated to a ROM-based disc.

The tray Ta for the RAM-based disc has a projection 51 on its right-hand edge along the X direction. A slot 54 is opened inside the projection 51, and the projection 51 joins the body of the tray Ta by a deformable thin portion 52 and a breaking weakness portion 53. The end face of the projection 51 transversely across the X direction constitutes a locking surface 51a.

The tray To for the ROM-based disc has no projection 51 with its right-hand edge 55 linearly flat.

A lock member 56 is slidably supported in the Z direction (vertically upward and downward) in the thickness of the right-hand plate 1c between the bottom plate 1f and the top surface 1h of the case 1 in the disc package P. As shown in FIG. 10, an urging spring 57 presses against the top surface of the lock member 56 to urge the lock member 56 downward, and the lock member 56 is shifted downward by the elastic force of the urging spring 57 in the Z direction.

The lock member 56 has alternate portions of lock portion 56a and non-lock portion 56b in the Z direction. The non-lock portion 56b is constituted by a slot. The pitch of the lock portions 56b in the Z direction is equal to the stack pitch of trays T.

With the disc package P unloaded from the disc device, the lock member 56 is urged downward, the lock portion 56a faces the locking surface 51a of the RAM-based disc tray Ta in the X direction, and is thus engaged with the locking surface 51a. When the disc package P is loaded into the package hold portion B in the disc device, a lock release member 58 (see FIG. 10) arranged in the device body A presses the bottom face 56c (see FIG. 5) of the lock member 56 exposed through the bottom plate if of the case 1, and the lock member 56 is slightly shifted upward in the Z direction, and the non-lock portion 56b faces the locking surface 51a of the RAM-based tray Ta.

The lock release member 58 is pressed against the small-area bottom face 56c of the lock member 56 to push the lock member 56 into the case 1 as shown in FIG. 5, and the lock release member 58 is urged by a leaf spring 58a in the direction of push-in. Alternatively, the lock release member 58 may be driven by a mechanical power in the direction of push-in.

When the disc package P is unloaded from the disc device, the second lock member L2 causes the lock portion 56a of the lock member 56 to be engaged with the locking surface 51a of the tray Ta for the RAM-based disc so that the tray Ta is locked preventing itself from being ejected. Since the tray To for the ROM-based disc has no projection 51, the tray To is free from the locking function by the second lock mechanism L2. When the disc package P is fully loaded into the package hold portion B in the device body A, the lock release member 58 disposed in the package hold portion B pushes the lock member 56 upward as shown, causing the non-lock portion 56b of the lock member 56 to face the locking surface 51a and thereby releasing the lock of the tray Ta for the RAM-based disc.

In summary, both the first lock mechanism L1 and the second lock mechanism L2 are released from their lock function in the loaded state of the disc package P in the disc device, and all trays are free to be drawn into the disc driving means E.

When the disc package P is unloaded from the disc device, the first lock mechanism L1 locks all trays and the second lock mechanism L2 locks the tray Ta having the RAM-based disc thereon. Pressing the top of the small-diameter shaft 41b of the lock shaft 41 by a finger in FIG. 9 releases the lock by the first lock mechanism L1, permitting only the tray To having the ROM-based disc thereon to be taken out of the case 1, for example, for replacement of the disc D. Since the tray Ta having the RAM-based disc thereon is prevented from being ejected, the smearing of the RAM-based disc with hands or the like is precluded and the RAM-based disc is thus reliably protected.

In the first lock mechanism L1, the small-diameter shaft 41b is projected out of the top surface 1h of the case 1, and can be pressed by a finger, and the lock member 56 in the second lock mechanism L2 has a small cross section, and the bottom face 56c (see FIG. 5) of the lock member 56 exposed through the bottom plate if of the case 1 is very small. In the unloaded state of the disc package P from the disc device, pressing the bottom face 56c with a finger is difficult and thus manual release of the lock of the second lock mechanism L2 is impracticable.

As shown in FIG. 3, a plurality of slits 1j are opened in the right-hand plate 1c in the disc package P, and the projection 51 of the tray Ta having the RAM-based disc thereon is exposed through the slit 1j. With the disc package P unloaded from the disc device, a tool such as the blade of a screwdriver may be inserted into the slit 1j to press the projection 51 of the edge of the tray Ta until the breaking weakness portion 53 is destroyed. The deformable thin portion 52 is deformed and the projection 51 sinks into the slot 54. As shown in FIGS. 11A and 11B, the front wall 54a of the slot 54 constitutes a slant backward locking surface (in the direction opposite to the X direction as shown), and the projection 51 deformed into the slot 54 is locked at a position (i) by the inner wall 54a as shown in FIG. 11B. The projection 51 sinks into the slot 54 and remains pushed in there.

The locking surface 51a at the end of the projection 51 does not touch the lock portion 56a of the lock member 56 in the state shown in FIG. 11B, and the lock of the tray Ta having the RAM-based disc by the second lock mechanism L2 is thus released. In the unloaded state of the disc package P from the disc device, pressing the small-diameter shaft 41b to release the first lock mechanism L1 allows one to eject the tray 1 out of the case 1 with the projection 51 sunk as shown in FIG. 11B, and the RAM-based disc is thus taken out of its tray.

The tray Ta with its projection 51 once pushed in cannot be recovered to its original state, and the tray cannot be used as a tray Ta for the RAM-based disc any more, and to use the tray continuously, the tray may be used as a ROM-based disc tray.

The projection 51 of the RAM-based disc tray Ta may be used to sense the type of tray (to sense whether the disc installed on a tray is RAM-based or not). For example, reflective sheets 61 may be attached onto the side of the projection 51, and photoreflectors 62 as sense means which face respective slits 1j formed in the right-hand plate 1c of the case 1 with the disc package P loaded are mounted in the device body A.

If any of the photoreflectors 62 detects a reflected light by the corresponding reflective sheets 61 when the disc package P is loaded in the device body A, the presence of the tray Ta having the RAM-based disc thereon is confirmed. As shown in FIG. 11B, the projection 51 may be pushed in, rendering the tray useless as the tray Ta for the RAM-based disc, and in this case, the tray may be used as ROM-based disc tray thereafter by detaching the reflective sheet 61, or as shown in FIG. 11B, when the projection 51 is pushed in, the angle of incidence of the photoreflector 62 may be changed so that it receives no reflective light from the reflective sheet 61.

Since the disc package of the present invention stores at least two types of discs such as RAM-based discs and ROM-based discs in a mixed fashion, the disc package may be used as a large storage memory medium, and with the RAM-based disc used, the disc package may be used as a personal library memory medium. With the identification means provided in each of the trays in the disc package, the type of disc in the disc package is determined, and one can know the type of the disc immediately when it is taken out. By supplementing the determination result with the determination result read by the head of the disc device, the accuracy of the determination of the disc is enhanced. By color coding the tray, the disc on each tray may be visually and easily identified.

What is claimed is:

1. A disc package comprising:
   a case that is to be loaded in a body of a disc device; and
   a plurality of trays which receive respectively a plurality of discs of two or more different types and which are accommodated in the case in a manner such that the trays are individually pulled out of the case, wherein the trays comprise respective identification means which are accessed by the disc device for recognizing the type of each disc received thereon;
   wherein each of the trays is provided with a hook with which ejection means in the body of the disc device is engaged, and wherein the identification means is provided on the hook and is accessed by the disc device through the ejection means.

2. A disc package according to claim 1, wherein the discs of different types comprise a read-only disc and a rewritable disc.

* * * * *